July 8, 1969    E. A. FRANCO-FERREIRA    3,454,468
FUEL ELEMENT FOR NEUTRONIC REACTOR AND
METHOD OF FABRICATION THEREOF
Filed March 29, 1968          Sheet _1_ of 2
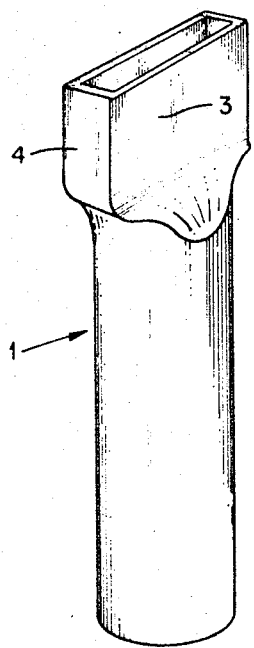
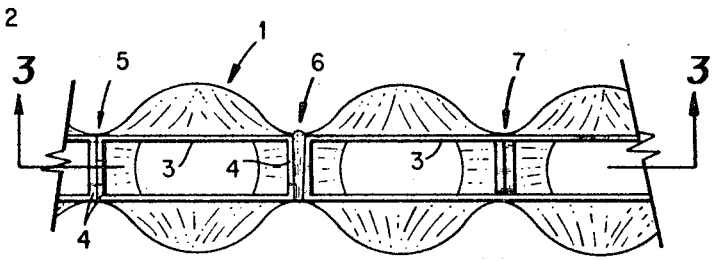
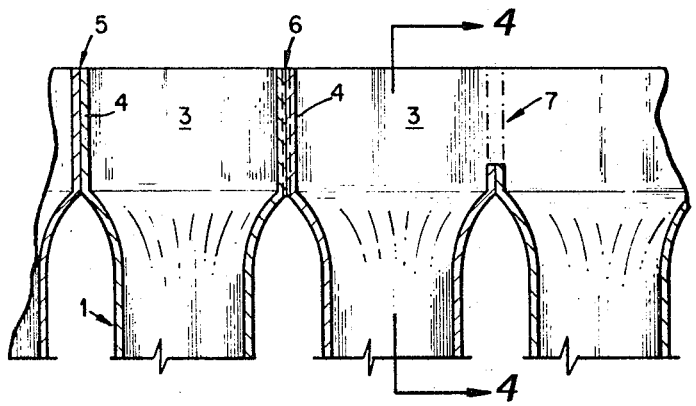
Fig. 1
Fig. 2
Fig. 3
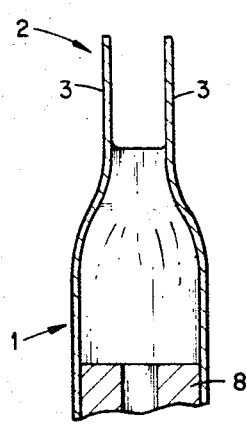
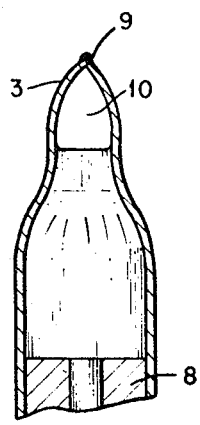
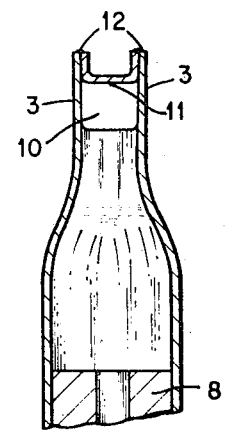
Fig. 4     Fig. 5     Fig. 6
INVENTOR.
Edgard A. Franco-Ferreira
BY
ATTORNEY.

United States Patent Office 3,454,468
Patented July 8, 1969

3,454,468
FUEL ELEMENT FOR NEUTRONIC REACTOR AND METHOD OF FABRICATION THEREOF
Edgard A. Franco-Ferreira, Nashville, Tenn., assignor to the United States of America as represented by the United States Atomic Energy Commission
Filed Mar. 29, 1968, Ser. No. 717,236
Int. Cl. G21c 3/32, 3/14
U.S. Cl. 176—78     10 Claims

ABSTRACT OF THE DISCLOSURE

An integral fuel pin and grid structure forms pin-type neutronic reactor fuel elements. Substantially cylindrical fuel pins are deformed at one end into a rectangular cross section to provide flat faces for metallurgically bonding the pins together in a fuel element while maintaining a spaced relationship along their remaining cylindrical portions. The bonded faces are then partially cut away and one of two alternative methods utilized for closing the end of the pins. According to one method the remaining faces are brought together and closed along their abutting edges by welding. Another method utilizes a cap inserted into the open ends and bonded thereto. An integral structure of interconnected fuel pins is thereby provided which is suitable for, but not restricted to, vented operation.

Background of the invention

The invention described herein relates generally to neutronic reactor fuel elements and more particularly to an integral fuel pin and grid structure suitable for vented operation, and a method of fabrication thereof. It was made in the course of, or under, a contract with the U.S. Atomic Energy Commission.

Fuel elements containing a multiplicity of fuel pins are commonly known and widely used in neutronic reactors. The particular mechanisms used for supporting the pins within a fuel element must prevent excessive vibration by the pins, minimize pressure drop of coolant flow and be easily fabricated with the pins into a fuel element. Typical of prior art designs is that shown in copending application of common assignee Ser. No. 645,578 filed June 9, 1967, and now abandoned.

The principal disadvantage of prior art pin-type fuel elements is that they are difficult to fabricate. This is particularly true in fuel elements wherein the individual fuel pins are vented for removal of gaseous fission products. Fabrication of such fuel elements has typically required the welding of a large number of intricate joints as well as a close individual inspection thereof to ensure the integrity of the welds.

It is, accordingly, a general object of the invention to provide a pin-type fuel element that is readily fabricated and inspected, and more specifically to provide such a fuel element which is suitable for use in a vented system.

Summary of the invention

In accordance with the invention, a readily fabricated, pin-type, neutronic reactor fuel element is provided which is suitable for vented operation. Substantially cylindrical fuel pins are deformed at one end into a rectangular cross section to provide flat faces for metallurgically bonding the pins together in a fuel element while maintaining a spaced relationship along their remaining cylindrical portions. The bonded faces are then partially cut away and the tube ends closed. An integral structure of interconnected fuel pins in fluid communication is thereby provided which is suitable for, but not restricted to, vented operation.

Brief description of the drawings

FIG. 1 is an isometric view of a single fuel pin with one end deformed in a rectangular transverse cross section in accordance with this invention.

FIG. 2 is a longitudinal sectional view of a row of fuel pins illustrating successive fabrication steps.

FIG. 3 is a transverse sectional view of the row of fuel pins of FIG. 2 taken along line 3—3.

FIG. 4 is a sectional view of the upper portion of a fuel pin of FIG. 3 taken along line 4—4.

FIG. 5 illustrates one method of closing the deformed upper end of the fuel pin of FIG. 4.

FIG. 6 illustrates an alternative method of closing the deformed upper end of the fuel pin of FIG. 4.

Description of the preferred embodiment

Figure 7:
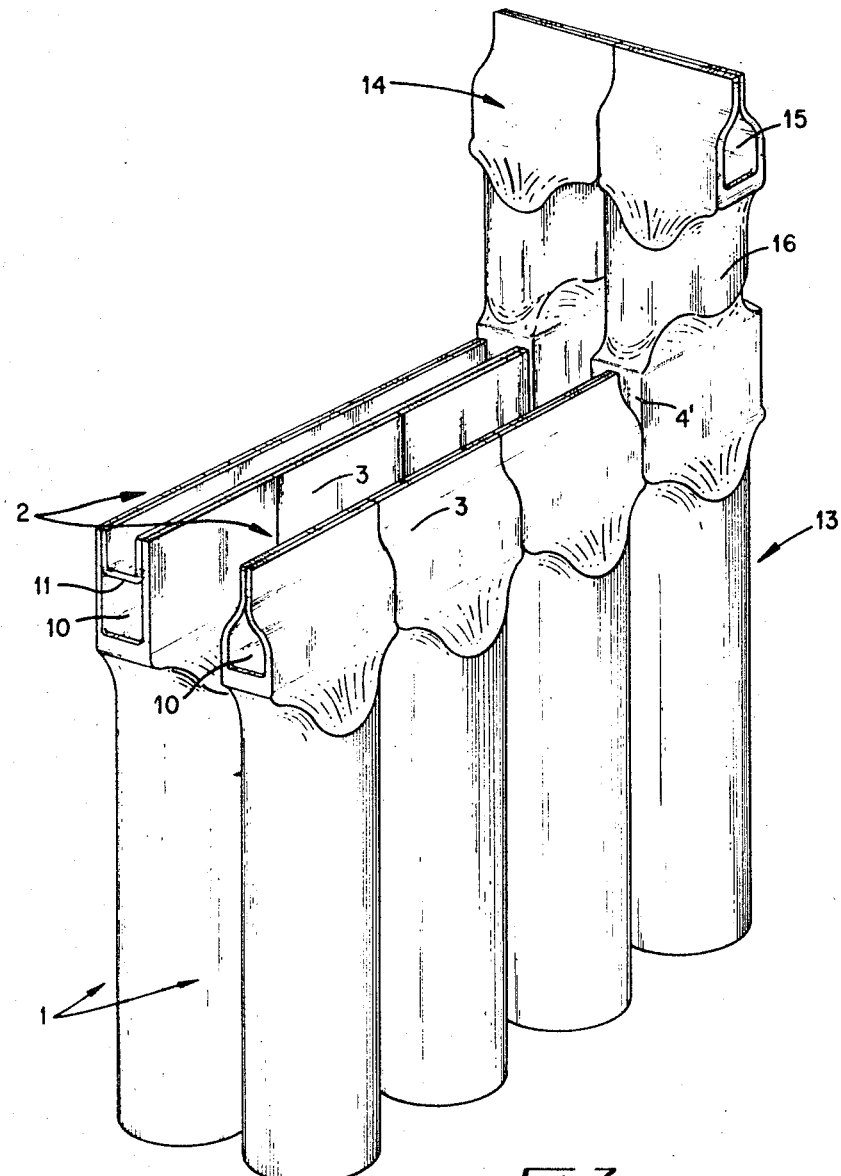
FIG. 7 is an isometric view of two partial rows of joined fuel pins closed according to the methods of FIGS. 5 and 6 and joined to a common manifold.

Referring initially to FIG. 1, an otherwise conventional casing 1 for a cylindrical fuel pin is provided with a deformed portion 2 at its top end. Deformed portion 2 has a rectangular cross section with lateral side faces 3 and 4 having greater and lesser lengths, respectively. Side 3 is restricted to a length greater than the diameter of the cylindrical portion of the fuel pin while side 4 has a length which is less than that diameter. The sum of the lengths of sides 3 and 4 remains approximately equal to the circumference of the original circular cross section. The deforming or shaping operation used to form the rectangular cross section of deformed portion 2 may be performed by conventional methods, and a double unit may be formed if desired and thereafter separated into two fuel pin casings or tubes. The bottoms of the pins or tubes, after fuel loading, are closed by welding end caps (not shown) of conventional design thereto.

The next series of successive fabrication steps is illustrated in FIGS. 2 and 3. Individual fuel pin casings 1 are first assembled in abutting relationship along side faces 4 as illustrated at 5. Full penetration welds or other suitable metallurgical bonds are next provided as illustrated at 6, joining side faces 4 at each junction using electron beam welding, brazing, or other suitable metallurgical bonding techniques. This step forms the pins in a firm assembly for one row of a fuel element. FIGS. 2 and 3 illustrate the advantageous spacing or separation between adjacent fuel pins provided by joining the side faces 4 of deformed portion 2. Such spacing is necessary for proper cooling of the individual fuel pins. In order to provide spacing between adjacent fuel pins, the length of side faces 3 must necessarily be greater than the diameter of the cylindrical portions of the fuel pins. As shown at 7, a portion of joined side faces 4 is then cut away to provide a continuous passage extending along the length of a row of fuel pins.

FIG. 4 is a sectional view taken normal to the planes of FIGS. 2 and 3 after side faces 4 have been partially cut away from a row of fuel pins. A fuel pellet 8 of conventional design is shown disposed within casing 1.

The preferred method of closing the tops of the fuel pins is illustrated in FIG. 5, a sectional view taken along the same plane as FIG. 4. After side faces 4 have been partially cut away from a row of fuel pins as shown in FIG. 4, the sides 3 are then crimped toward each other as shown in FIG. 5, and a seam weld 9 applied. The streamlined shape of sides 3 after they have been crimped together facilitates the flow of coolant through an assembly of such pins. A common passageway 10 interconnecting each fuel pin is formed by this method. Passageway 10 ensures a uniform pressure distribution within the fuel pins and facilitates venting thereof.

Another, alternative, method of closing the top of the fuel pins is shown in FIG. 6 which is also a sectional view taken along the same plane as FIG. 4. Here an elongated cap 11 having a U-shaped cross section is inserted between sides 3 and seam welds 12 applied. In this embodiment, interconnecting passageway 10 may or may not be utilized as desired for a specific reactor design. In either embodiment, the lower ends of the fuel tubes may be stabilized by conventional spacers applied to the surface of the pins.

In instances where the fuel pins are to be vented to an external system, the arrangement shown in FIG. 7 may be utilized in assembling a plurality of rows of fuel pins into a fuel element. In that figure, rows of pins closed according to each of the two methods described above in reference to FIGS. 5 and 6 are shown for illustrative purposes. Ordinarily, of course, only one closure method would be utilized in any single fuel element which comprises a plurality of such rows of fuel pins. As shown, an end fuel pin 13 is not closed in the same manner as disclosed above but is provided with a second deformed portion 14 with the long dimension thereof oriented at right angles to the orientation of deformed portion 2. The smaller end faces of deformed portions 14 are joined together in substantially the same manner as described above for joining adjacent fuel pins within a row of pins. Either of the above discussed methods for closing the ends of deformed portions 2 may also be used to close the open ends of deformed portions 14. In the case of end fuel pins 13, side faces 4 are not cut away except that one side face 4' is apertured to provide fluid communication with passageway 10. A metallurgical bond is then provided by brazing or suitable technique in order to attach side face 4' to a corresponding row of fuel pins. A second passageway 15 is provided through second deformed portions 14 which acts as a collection manifold for gaseous fission products generated within individual fuel pins and passing through passageways 10 of a plurality of fuel pin rows. The cylindrical transition portion 16 between the first and second deformed portions of end fuel pins 13 is hollow and thus facilitates flow of gaseous fission products between passageways 10 and 15. Passageway 15 may in turn be vented to a suitable central manifold provided for collecting fission product gases from a multiplicity of fuel elements within a neutronic reactor.

The above described construction thus provides an integral pin-type fuel element which is readily fabricated and inspected due to the simplicity and accessibility of all welds, and which is suitable for, but not restricted to, vented operation.

The above description of the invention was offered for illustrative purposes only, and should not be interpreted in a limiting sense. It is intended rather that the invention be limited only by the claims appended hereto.

What is claimed is:

1. A pin-type fuel element for use in a neutronic reactor comprising: a multiplicity of substantially cylindrical fuel pins disposed in a regular array to form a bundle, each of said generally cylindrical fuel pins being deformed at one end into a shape having a rectangular transverse cross section, each of said fuel pins being metallurgically bonded to at least one other of said fuel pins along a face of said deformed shape and spaced apart from adjacent fuel pins along the remaining unbonded faces of said deformed shape so as to provide coolant flow passageways.

2. The fuel element of claim 1 wherein apertures are provided through said bonded faces of said deformed shape to provide fluid communication between said fuel pins.

3. The fuel element of claim 1 wherein said deformed shape having a rectangular transverse cross section is characterized by two lateral faces having lengths greater than the diameter of said substantially cylindrical fuel pin, and two lateral faces having lengths less than the diameter of said fuel pin; each of said fuel pins being metallurgically bonded to at least one other of said fuel pins along at least one of said faces having a length less than the diameter of said fuel pin.

4. A pin-type fuel element for use in a neutronic reactor comprising a multiplicity of substantially cylindrical fuel pins disposed in a regular array to form a bundle, each of said substantially cylindrical fuel pins being deformed at one end into a first shape having a generally rectangular cross section, each of said fuel pins being metallurgically bonded to at least one other of said fuel pins along a face of said first deformed shape to form rows of fuel pins; and means for integrally joining a plurality of said rows of fuel pins.

5. The fuel element of claim 4 wherein said means for joining a plurality of said rows of fuel pins comprises at least one of said fuel pins in each of said rows of fuel pins being deformed into a second shape having a generally rectangular cross section, said second deformed shape being axially spaced apart from said first deformed shape, each of said fuel pins having said second deformed shape being metallurgically bonded to at least one other fuel pin in another row along a face of said second deformed shape.

6. The fuel element of claim 5 wherein said fuel pins and said rows of fuel pins are in fluid communication through said first and second deformed shapes.

7. The fuel element of claim 5 wherein said first and second deformed shapes are oriented at right angles to each other.

8. A method of fabricating a pin-type fuel element suitable for vented operation comprising: deforming one end of a multiplicity of substantially cylindrical fuel pins into a shape having a rectangular transverse cross section and defining flat lateral faces having greater and lesser lengths, arranging a plurality of said pins in a row with adjacent fuel pins abutting along said lateral faces having lesser lengths, providing a metallurgical bond between adjacent fuel pins along said abutting faces, cutting away a portion of said abutting bonded faces, and closing the deformed ends of said fuel pins.

9. The method of claim 8 wherein the deformed ends of said fuel pins are closed by crimping together said lateral faces having greater length, and metallurgically bonding said faces to each other.

10. The method of claim 8 wherein the deformed ends of said fuel pins are closed by inserting an elongated cap having a U-shaped lateral cross section between said lateral faces having greater length, and metallurgically bonding said cap to said faces.

References Cited

UNITED STATES PATENTS

| | | | |
|---|---|---|---|
| 2,346,376 | 4/1944 | Heavener | 29—157.4 X |
| 2,429,888 | 10/1947 | Moore | 29—157.4 |
| 3,031,388 | 4/1962 | Barchet | 176—78 X |
| 3,138,536 | 6/1964 | Murray et al. | 176—78 X |
| 3,206,369 | 9/1965 | Fortescue et al. | 176—78 X |
| 3,392,438 | 7/1968 | Coulter et al. | 29—480 X |

CARL D. QUARFORTH, Primary Examiner.

M. J. SCOLNICK, Assistant Examiner.

U.S. Cl. X.R.

29—471.1, 475, 480; 176—76, 37